United States Patent [19]

Nohr et al.

[11] Patent Number: 5,696,191

[45] Date of Patent: Dec. 9, 1997

[54] SURFACE-SEGREGATABLE COMPOSITIONS AND NONWOVEN WEBS PREPARED THEREFROM

[75] Inventors: Ronald S. Nohr, Roswell; J. Gavin MacDonald, Decatur, both of Ga.

[73] Assignee: Kimberly-Clark Worldwide, Inc., Neenah, Wis.

[21] Appl. No.: 455,788

[22] Filed: May 31, 1995

Related U.S. Application Data

[60] Division of Ser. No. 119,783, Sep. 13, 1993, abandoned, which is a continuation-in-part of Ser. No. 485,921, Feb. 27, 1990, abandoned, which is a continuation-in-part of Ser. No. 408,833, Sep. 18, 1989, abandoned.

[51] Int. Cl.$^6$ ...................................................... C08K 5/24
[52] U.S. Cl. ........................ 524/264; 524/269; 524/588; 428/288; 264/574
[58] Field of Search .......................... 428/288; 524/264, 524/269, 588

[56] References Cited

U.S. PATENT DOCUMENTS

| | | | |
|---|---|---|---|
| Re. 32,514 | 10/1987 | Steklenski | 524/32 |
| D. 239,566 | 4/1976 | Vogt | D59/2 R |
| 239,566 | 4/1881 | Vogt | D59/2 R |
| 264,512 | 5/1882 | Rogers | D59/2 B |
| D. 264,512 | 5/1982 | Rogers | D59/2 B |
| 3,016,599 | 1/1962 | Perry, Jr. | 28/78 |
| 3,341,394 | 9/1967 | Kinney | 161/72 |
| 3,360,421 | 12/1967 | Sands | 161/63 |
| 3,491,137 | 1/1970 | Zaweski et al. | 260/448.8 |
| 3,620,821 | 11/1971 | Jones | 117/126 |
| 3,629,308 | 12/1971 | Bailey et al. | 260/448.2 |
| 3,655,862 | 4/1972 | Dorschner et al. | 264/290 |
| 3,692,618 | 9/1972 | Dorschner et al. | 161/72 |
| 3,704,198 | 11/1972 | Prentice | 161/148 |
| 3,705,068 | 12/1972 | Dobo et al. | 156/441 |
| 3,723,402 | 3/1973 | Owen et al. | 260/93.7 |
| 3,755,527 | 8/1973 | Keller et al. | 264/210 |
| 3,766,115 | 10/1973 | Sands | 260/29.1 |
| 3,802,817 | 4/1974 | Matsuki et al. | 425/66 |
| 3,849,241 | 11/1974 | Butin et al. | 161/169 |
| 3,853,651 | 12/1974 | Porte | 156/73.6 |
| 3,855,046 | 12/1974 | Hansen et al. | 161/150 |
| 3,867,188 | 2/1975 | Campbell et al. | 117/138.8 |
| 3,929,509 | 12/1975 | Taskier | 136/146 |
| 3,973,068 | 8/1976 | Weber | 28/198 |
| 3,978,185 | 8/1976 | Buntin et al. | 264/93 |
| 4,064,605 | 12/1977 | Akiyama et al. | 28/103 |
| 4,070,218 | 1/1978 | Weber | 156/167 |
| 4,091,140 | 5/1978 | Harmon | 428/288 |
| 4,100,319 | 7/1978 | Schwartz | 428/171 |
| 4,100,324 | 7/1978 | Anderson et al. | 428/288 |
| 4,105,569 | 8/1978 | Crossfield | 252/8.6 |
| 4,118,531 | 10/1978 | Hauser | 428/224 |
| 4,150,013 | 4/1979 | Punderson | 260/42.26 |
| 4,340,563 | 7/1982 | Appel et al. | 264/518 |
| 4,405,297 | 9/1983 | Appel et al. | 425/72 |
| 4,426,203 | 1/1984 | Abel et al. | 8/138 |
| 4,434,204 | 2/1984 | Hartman et al. | 428/198 |
| 4,444,563 | 4/1984 | Abel | 8/588 |
| 4,446,090 | 5/1984 | Lovgren et al. | 264/211 |
| 4,480,009 | 10/1984 | Berger | 428/447 |
| 4,493,868 | 1/1985 | Meitner | 428/171 |
| 4,499,149 | 2/1985 | Berger | 428/447 |
| 4,500,659 | 2/1985 | Kroupa et al. | 523/213 |
| 4,535,113 | 8/1985 | Foster et al. | 524/262 |
| 4,563,190 | 1/1986 | Topfl | 8/524 |
| 4,578,414 | 3/1986 | Sawyer et al. | 524/310 |

(List continued on next page.)

FOREIGN PATENT DOCUMENTS

| | | |
|---|---|---|
| 1049682 | 2/1979 | Canada. |
| 0071349A2 | 2/1982 | European Pat. Off.. |
| 0 071 349 | 2/1983 | European Pat. Off.. |
| 0071349A2 | 2/1983 | European Pat. Off.. |
| 25 06 667 | 6/1974 | Germany. |
| 1 273 445 | 5/1972 | United Kingdom. |

OTHER PUBLICATIONS

R. H. Somani and M. T. Shaw, *Maromolecules*, 14, 866 (1981).

S. N. Pandit et al. *Poly. Com*, 2, 68 (1981).

(List continued on next page.)

*Primary Examiner*—Karen A. Dean
*Attorney, Agent, or Firm*—William E. Maycock

[57] ABSTRACT

A surface-segregatable, melt-extrudable thermoplastic composition is provided which includes at least one thermoplastic polyolefin and at least one additive having the general formula,

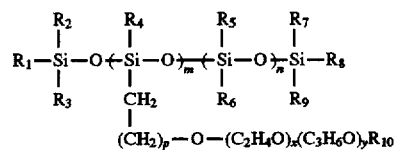

in which:

(A) $R_1$–$R_9$ are independently selected monovalent $C_1$–$C_3$ alkyl groups;

(B) $R_{10}$ is hydrogen or a monovalent $C_1$–$C_3$ alkyl group;

(C) m represents an integer of from 1 to about 4;

(D) n represents an integer of from 0 to about 3;

(E) the sum of m and n is in the range of from 1 to about 4;

(F) p represents an integer of from 0 to about 5;

(G) x represents an integer of from 1 to about 10;

(H) y represents an integer of from 0 to about 5;

(I) the ratio of x to y is equal to or greater than 2;

(J) the additive has a molecular weight of from about 350 to about 1,400; and (K) the additive is present in an amount of from about 0.5 to about 5 percent by weight, based on the amount of thermoplastic polyolefin.

Melt-extrusion of the foregoing composition results in a wettable nonwoven web which remains wettable for at least two years at ambient temperature. A method of making such a wettable nonwoven web also is provided.

18 Claims, No Drawings

U.S. PATENT DOCUMENTS

| | | | |
|---|---|---|---|
| 4,585,830 | 4/1986 | Sweet | 524/862 |
| 4,627,811 | 12/1986 | Greiser et al. | 425/72 |
| 4,644,045 | 2/1987 | Fowells | 526/348 |
| 4,645,691 | 2/1987 | Ona et al. | 427/180 |
| 4,652,489 | 3/1987 | Crass et al. | 428/337 |
| 4,659,777 | 4/1987 | Riffle et al. | 525/100 |
| 4,663,220 | 5/1987 | Wisneski et al. | 428/221 |
| 4,672,005 | 6/1987 | Dyer | 428/474.4 |
| 4,689,362 | 8/1987 | Dexter | 524/266 |
| 4,698,388 | 10/1987 | Ohmura et al. | 525/88 |
| 4,745,142 | 5/1988 | Ohwaki et al. | 524/87 |
| 4,857,251 | 8/1989 | Nohr et al. | 264/103 |
| 4,920,168 | 4/1990 | Nohr et al. | 524/188 |
| 4,923,914 | 5/1990 | Nohr et al. | 524/99 |

OTHER PUBLICATIONS

A. J. Sabia and R. B. Metzler, *Nonwovens Ind.*, 14, 16 (1983).

V. A. Wente, "Superfine Thermoplastic Fibers", *Industrial and Engineering Chemistry*, Vo. 48, No. 8, pp. 1342–1346 (1956).

V. A. Wente, et al., "Manufacture of Superfine Organic Fibers", Navy Research Laboratory, WDC, NRL report 4364 (111437), dated May 25, 1954, U.S. Dept. of Commerce, Office of Technical Services.

R. R. Butin and D. W. Lohkamp, "Melt Blowing—A One–Step Web Process For New Nonwoven Products", Journal Of The Tech. Assoc. of the Pulp & Paper Indust., vol. 56, No. 4, pp. 74–77 (1973).

A. J. Sabia and R. B. Metzler, *Nonwovens Ind.*, 14, 16 (1983).

*Chem. Abstr.*, 84:91066z (1976).

*Chem. Abstr.*, 77:89559z (1972).

"Goldschmidt informiert . . . ", Jan. 1982, No. 56, Mar. 1982, English Edition, Th. Goldschmidt AG.

"Surfactants at Th. Goldschmidt AG", Th. Goldschmidt AG. "TEGOPREN® Silicone Surfactants—Products, Data, Information", Th. Goldschmidt AG.

R.H. Somani and M.T. Shaw, *Macromolecules*, No. 14, pp. 886–888. (1981).

"SILWET® Surfactants" Bulletin SC–877, P8–253, Feb. 1988–10M, *Union* Carbide Corporation.

"Goldschmidt informiert . . . ", Apr. 1984, No. 63, Dec. 1984, Functional Oligomers, Th. Goldschmidt AG.

"Silicon Compounds Register and Review", Petrarch Systems Silanes and Silicones, pp. 253–300, Petrarch Systems.

"SILWET® Surface Active Copolymers", Bulletin SUI–394A, Jul. 1985–5M.

R.R. Butin and D.W. Lohkamp, "Melt Blowing—A One–Step Web Process for New Nonwoven Products", *Journal Of The Tech. Assoc. of the Pulp & Paper Industry*, vol. 56, No. 4, pp. 74–77 (1973).

V.A. Wente, et al., "Manufacture of Superfine Organic Fibers", Navy Research Laboratory, WDC, NRL Report 4364 (111437), dated May 25, 1954, U.S. Dept. of Commerce, Office of Technical Services.

V.A. Wente "Superfine Thermoplastic Fibers", *Industrial and Engineering Chemistry*, vol. 48, No. 8, pp. 1342–1346 (1956).

A.J. Sabia and R.B. Metzler, "The Role of Silicones in Nonwoven Fabric Applications", Nonwovens Industry, No. 14, p. 16, (1983).

S.N. Pandit, et al. "Compounding of Glass Fiber–Reinforced Polypropylene and Investigation of its Mechanical Properties Under Simple and Complex Loading", *Polymer Composites*, vol. No. 2, pp. 68–74 (1981).

"SILWET® Surface Active Copolymers", Bulletin SUI–394A, 7/85–5M Union Carbide Corporation.

"SILWET® Surfactants", Bulletin SC–877, P8–2538, 2/88–10M, Union Carbide Corporation.

SURFACE-SEGREGATABLE COMPOSITIONS AND NONWOVEN WEBS PREPARED THEREFROM

This application is a division of Ser. No. 08/119,783 entitled "SURFACE-SEGREGATABLE COMPOSITIONS AND NONWOVEN WEBS PREPARED THEREFROM" and filed in the U.S. Patent and Trademark Office on Sep. 13, 1993 now abandoned, which is a continuation-in-part of application Ser. No. 07/485,921, filed Feb. 27, 1990 now abandoned, which in turn is a continuation-in-part of application Ser. No. 07/408,833, filed Sep. 18, 1989, now abandoned.

CROSS-REFERENCE TO RELATED APPLICATION

A method of preparing a nonwoven web which is not wettable by water immediately after its formation but which becomes wettable within about 24 hours thereafter without any post-formation treatment is described and claimed in application Ser. No. 07/566,938, entitled METHOD OF PREPARING A NONWOVEN WEB HAVING DELAYED WETTABILITY, filed of even date in the names of Ronald S. Nohr and J. Gavin MacDonald, which application is a continuation-in-part of application Ser. No. 07/485,922, filed Feb. 27, 1990, which in turn is a continuation-in-part of application Ser. No. 07/408,812, filed Sep. 18, 1989, now abandoned.

BACKGROUND OF THE INVENTION

The present invention relates to a surface-segregatable, melt-extrudable thermoplastic composition which, when melt-extruded to form a nonwoven web, results in a wettable web which does not become significantly less wettable over time.

Surface-segregatable, melt-extrudable thermoplastic compositions are described in commonly assigned application Ser. No. 07/181,359, entitled SURFACE-SEGREGATABLE, MELT-EXTRUDABLE THERMOPLASTIC COMPOSITION, filed. on Apr. 14, 1988 in the names of Ronald S. Nohr and J. Gavin MacDonald, now U.S. Pat. No. 4,923,914. The application describes a surface-segregatable, melt-extrudable thermoplastic composition which comprises at least one thermoplastic polymer and at least one additive having at least two moieties, A and B, in which:

(A) the additive is compatible with the polymer at melt extrusion temperatures but is incompatible at temperatures below melt extrusion temperatures, but each of moiety A and moiety B, if present as separate compounds, would be incompatible with the polymer at melt extrusion temperatures and at temperatures below melt extrusion temperatures;

(B) moiety B has at least one functional group which imparts to the additive at least one desired characteristic;

(C) the molecular weight of the additive is in the range of from about 400 to about 15,000; and (D) the weight ratio of the polymer to the additive is in the range of from about 1 to about 1,000;

with the proviso that the additive cannot be a compound having the general formula,

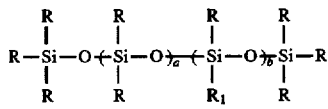

in which each R independently is a monovalent organic group selected from the group consisting of alkyl groups; $R_1$ is a monovalent organic group containing at least one ethyleneoxy group, vicinal epoxy group, or amino group; and a and b, which can be the same or different, each have a value of at least 1. In preferred embodiments, the additive is a siloxane-containing compound, and one of the desired characteristics is wettability by water when the polymer is inherently hydrophobic.

The compositions described in that patent are particularly useful for the formation of nonwoven webs by such melt-extrusion processes as meltblowing, coforming, and spunbonding. Upon being melt-extruded, such compositions result in a fiber (or film) having a differential, increasing concentration of the additive from the center to the surface thereof, such that the concentration of additive toward the surface of the fiber is greater than the average concentration of additive in the more central region of the fiber and imparts to the surface of the fiber at least one desired characteristic which otherwise would not be present. The additive is miscible with the polymer at melt extrusion temperatures, under which conditions the additive and the polymer form a metastable solution. As the temperature of the newly formed fiber drops below melt extrusion temperatures, the additive becomes significantly less compatible with the polymer. Concurrent with this marked change in compatibility, the polymer begins to solidify. Both factors contribute to the rapid migration or segregation of the additive toward the surface which takes place in a controllable manner.

When the additive was a siloxane-containing compound and the desired characteristic was water-wettability, the resulting nonwoven web's often became less wettable over time and frequently reverted to a nonwettable state. This loss of wettability, or aging, was accelerated when the polymer composition contained titanium dioxide. However, the absence of titanium dioxide did not prevent the aging which typically was complete within a matter of days.

More traditional methods for imparting wettability to inherently hydrophobic nonwoven webs involve spraying or coating the web with a surfactant solution during or after its formation. The web then must be dried, and the surfactant which remains on the web is removed upon exposure of the web to aqueous media. Alternatively, a surfactant can be included in the polymer which is to be melt-processed, as disclosed in U.S. Pat. Nos. 3,973,068 and 4,070,218 to R. E. Weber. However, the surfactant must be forced to the surface of the fibers from which the web is formed. This typically is done by heating the web on a series of steam-heated rolls or "hot cans". This process, called "blooming", is expensive and still has the disadvantage of ready removal of the surfactant by aqueous media. Moreover, the surfactant has a tendency to migrate back into the fiber which adversely affects shelf life, particularly at high storage temperatures. In addition, it is not possible to incorporate in the polymer levels of surfactant much above 1 percent by weight because of severe processability problems; surfactant levels at the surface appear to be limited to a maximum of about 0.33 percent by weight. Most importantly, the blooming process results in web shrinkage in the cross-machine direction and a significant loss in web tensile strength.

Other methods of imparting wettability to, or otherwise affecting the surface characteristics of, shaped articles made from polyolefins and other hydrophobic polymers are known. Representative examples of a number of such methods are described in the paragraphs which follow.

U.S. Pat. No. 4,578,414 to L. H. Sawyer and G. W. Knight describes wettable olefin polymer fibers. The fibers are formed from a composition comprising a polyolefin resin and one or more defined surface-active agents. Such agents may be present in an amount of from about 0.01 to about 5 percent by weight. Such agents can be (1) an alkoxylated alkyl phenol in combination with a mixed mono-, di-, and/or triglyceride; (2) or a polyoxyalkylene fatty acid ester; or (3) a combination of (2) with any part of (1). The preferred polyolefin is polyethylene, and all of the examples employed an ethylene/1-octene copolymer, the latter apparently being a minor component. The surface-active agents are stated to bloom to the fabricated fiber surfaces where at least one of the surface-active agents remains partially embedded in the polymer matrix. The patent further states that the permanence of wettability can be controlled through the composition and concentration of the additive package.

Polysiloxane/polyoxazoline block copolymers are disclosed in U.S. Pat. No. 4,659,777 to J. S. Riffle and I. Yilgor. The copolymers are stated to be useful as surface-modifying additives for base polymers. Such use apparently has primary reference to personal care products where the surface properties to be imparted include glossiness, smoothness, and lubricity. However, incorporation of the copolymers into fibers is stated to impart surface stain resistance, antistatic properties, flame retardancy, and wettability by both polar and nonpolar solvents. Such incorporation preferably is in the range of from about 1 to 5 parts by weight. Suitable base polymers include some vinyl polymers, acrylate polymers, polyurethanes, cellulose derivatives, and polyethylene, polypropylene, ethylene-propylene copolymers, and copolymers of ethylene with, for example, vinyl acetate. However, the single example illustrating incorporation of the disclosed copolymers into a base polymer employed as the base polymer poly(vinyl chloride), and the resulting mixture was used to cast films from solution.

U.S. Pat. No. 4,689,362 to M. Dexter relates to stabilized olefin polymer insulating materials. Briefly, insulating material for electric wire and cable consists of an olefin polymer stabilized against electrical failure resulting from voltage stress by the presence therein of a polydialkylsiloxanepolyoxyalkylene block or graft copolymer. In every instance, the polyoxyalkylene portions of the copolymers are hydroxy-terminated.

U.S. Pat. No. 4,698,388 to H. Ohmura et al. describes a method for modifying the surface of a polymer material by means of a block copolymer. The block copolymer consists of a hydrophilic polymer portion formed from a vinyl monomer and a polymer portion which is compatible with the polymer material, also formed from a vinyl monomer. The block copolymer is added to the polymer material by, for example, coating the material with a solution or suspension of the block copolymer, mixing the block copolymer with the polymer material during formation of the article, forming a film from the block copolymer which then is melt-pressed or adhered to the surface of the polymer material, and coating the surface of the polymer material with powdered block copolymer.

A stainproof polyester fiber is described by U.S. Pat. No. 4,745,142 to S. Ohwaki et al. The fiber comprises at least one fiber-forming polyester copolymer comprising a backbone polyester polymer and at least one substituent which blocks at least a portion of the terminals of the molecules of the backbone polyester moiety. The substituent consists of a polyoxyalkylene glycol group. According to the disclosure referenced by the Examiner, the copolymer can be blended with from 0.001 percent by weight to no more than 0.5 percent by weight of an organic polysiloxane compound. The preferred polysiloxane compounds apparently are dialkyl polysiloxanes. However, such compounds can be polyether-modified silicone oils.

Polymer compositions having a low coefficient of friction are described by U.S. Pat. No. Re. 32,514 to D. J. Steklenski. The compositions comprise a blend of at least 80 percent by weight of a polymer and at least 0.35 percent by weight of a cross-linked silicone polycarbinol. The polymer preferably is a blend of cellulose nitrate and a hydrophobic acrylate polymer. The silicone polycarbinol in general is a hydroxy-terminated polysiloxane or hydroxy-substituted polysiloxane. The compositions typically are prepared by dissolving the polymer or polymer blend, silicone polycarbinol, and cross-linking agent in a suitable solvent and casting a film from which the solvent is allowed to evaporate.

Canadian Patent No. 1,049,682 describes the inclusion in a thermoplastic polymer of from 0.1 to 10 percent by weight of a carboxy-functional polysiloxane. Suitable thermoplastic polymers include polyolefins. Such inclusion is stated to enhance the properties or characteristics of the thermoplastic polymer in one or more ways. By way of illustration, products or articles made from the polymer mixture were stated to have self-lubricating properties and increased resistance to wear. For molded articles, less friction during transfer, injection or extrusion molding was observed, and better release of parts from the molds was obtained. See, also, German Published Patent Application (Offenlegungschrift) No. 2,506,667 [*Chem. Abstr.*, 84:91066z (1976)].

Other, similar references which may be of interest include R. H. Somani and M. T. Shaw, *Macromolecules*, 14, 886 (1981), which describes the miscibility of polydimethylsiloxane in polystyrene; and S. N. Pandit et al., *Polym. Compos.*, 68 (1981), which reports the use of a vinyltriethoxysilane polymer as a coupling agent in glass fiber-reinforced polypropylene.

It also may be noted that polysiloxanes have been utilized in the production of nonwoven webs or fabrics, or products made therefrom, as illustrated by the references which follow.

U.S. Pat. No. 3,360,421 to S. Sands describes a bonded nonwoven backing material having perforate selvage which is used in the manufacture of carpet. In the production of the nonwoven backing material, a nonwoven web is produced from a polyolefin such as polyethylene or polypropylene. The resulting web then is subjected to bonding conditions, followed by applying to the web a lubricant which can be, among other things, methyl hydrogen polysiloxane and dimethyl polysiloxane.

The treatment of fibers with siloxane-polyoxyalkylene block copolymers containing methoxysiloxy groups is described in U.S. Pat. No. 3,620,821 to G. C. Jones. Such block copolymer typically is applied as a solution to a fibrous material by any suitable means, such as dipping, spraying, brushing, padding, and the like. The block copolymer then is cured on the fibrous material by any suitable means, such as by heating the treated fibrous material, optionally in the presence of a curing catalyst. The treated and cured fibrous materials are stated to have improved soil release properties and are used in the manufacture of drapes, clothing, upholstery, and the like.

A finish composition for application to a continuous filament polypropylene sheet is disclosed in U.S. Pat. No.

3,766,115 to S. Sands. The composition comprises a mixture of two polysiloxane components, the first of which is a dyeable component comprising a primary or secondary aminoalkyl- or aminoalkoxyalkylpolysiloxane fluid having an amine functionality in the range of 4–7 percent and being substantially free of other reactive groups. The second component is a lubricant component comprising a polydialkyl/arylsiloxane fluid having hydroxy end groups and being substantially free of other reactive groups. The polypropylene sheet typically is a spunbonded sheet made from isotactic polypropylene.

U.S. Pat. No. 3,867,188 to P. E. Campbell and J. G. Kokoszka relates to a spunbonded nonwoven fabric which is especially useful as a carpet backing. The fabric has on it a silicone-glycol copolymer having the general formula:

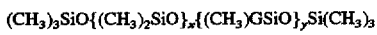

in which G is a radical of the structure $-R(C_3H_6)_zOH$, R is an alkylene radical containing from 1 to 18 carbon atoms, x has an average value of from 40–90, y has an average value of from 1–10, and z has an average value of from 1–10.

U.S. Pat. No. 3,929,509 to H. T. Taskier describes a hydrophilic microporous film which is useful as a battery separator. The film comprises a hydrophobic microporous film coated with a silicone glycol copolymer surfactant, preferably at a level of from 2 to 20 percent by weight, based on the uncoated film. In preferred embodiments, the surfactant coating comprises a mixture of a silicone glycol copolymer surfactant and a second surfactant which preferably is an imidazoline tertiary amine. The silicone glycol copolymer surfactant preferably is a polyoxyethylene polymethylsiloxane.

A yarn finish formulation is disclosed in U.S. Pat. No. 4,105,569 to R. J. Crossfield. In preferred embodiments, the formulation contains a hydrocarbon-soluble, long molecular chain polymeric viscosity improver, such as polyisobutylene, and a polysiloxane. Preferably, the polysiloxane is an alkoxylated polysiloxane, such as a dimethylpolysiloxane with substituted polyethylene glycol or polypropylene glycol side chains or mixed polyethylene/polypropylene glycol side chains.

U.S. Pat. No. 4,563,190 to R. Töpfl describes a siloxane/oxyalkylene copolymer as an optional component of a dyeing assistant for dyeing or printing polyamide fiber material with anionic dyes. See also U.S. Pat. Nos. 4,444,563 to H. Abel and 4,426,203 to H. Abel and J. Oxe.

U.S. Pat. No. 4,645,691 to I. Ona and M. Ozaki describes a method for treating materials with organopolysiloxane compounds. The method involves applying to the material a composition containing a silicone compound which has one or more alkoxysilylalkyl groups and one or more polyoxyalkylene groups. The materials to be treated preferably are fibers and fiber-containing materials.

U.S. Pat. No. 4,672,005 to M. E. Dyer describes a process for improving the hygroscopic, soil release, and other surface properties of a polymer substrate. The process involves contacting the substrate with an aqueous mixture containing a water-soluble vinyl monomer and a hydrophobic vinyl monomer. Polymerization of the water-soluble vinyl monomer then is initiated by a polymerization initiator, thereby forming a vinyl polymer on the surface of the polymer substrate.

For a limited review of similar applications of silicones, see A. J. Sabia and R. B. Metzler, *Nonwovens Ind.*, 14, 16 (1983). Also note British Patent No. 1,273,445 [*Chem. Abstr.*, 76: 89559z (1972)], which describes the use of a block polysiloxane, among other materials, in the preparation of a leather substitute.

It may be noted that the above review briefly discusses polysiloxanes which have been modified by inclusion of a poly(oxyalkylene) moiety; such modified polysiloxanes can be employed in the composition of the present invention as an additive.

A modified polysiloxane in which the poly(oxyalkylene) moiety is a poly(oxypropylene) is described in U.S. Pat. No. 3,867,188 to P. E. Campbell and J. G. Kokoszka. The modified polysiloxane apparently is employed as a lubricant which coats a spunbonded nonwoven fabric. The fabric, in turn, is employed as a carpet backing. The addition of the modified polysiloxane to the backing is stated to reduce damage to the backing which results from the tufting process used to manufacture the carpet.

Additionally, polysiloxanes have been used in the manufacture of films. For example, U.S. Pat. No. 4,652,489 describes a sealable, opaque polyolefinic multilayer film. The film is composed of a polypropylene base layer, a nonsealable surface layer, and a sealable surface layer. The nonsealable layer is a combination of a propylene homopolymer and a slip agent which preferably is a polydiorganosiloxane. The polydiorganosiloxane is used in an amount of from about 0.3 to about 2.5 percent by weight and preferably comprises a polymethylphenylsiloxane or a polydimethylsiloxane.

Finally, several references are known which are or may be of interest in relation to the additive when it contains a disubstituted siloxane. Such references are described below.

Siloxane-oxyalkylene block copolymers are disclosed in U.S. Pat. No. 3,629,308 to D. L. Bailey and A. S. Pater. The copolymers are stated to be particularly useful as a foam stabilizer in the production of polyurethane resin foams. The copolymers are represented by the formula:

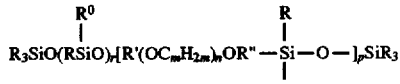

in which R is a monovalent hydrocarbon group, $R^0$ is hydrogen or a monovalent hydrocarbon group, R' is hydrogen or a monovalent hydrocarbon group, R" is a divalent hydrocarbon group, r has a value of at least 0, m is an integer that has a value of at least 2, n is a number that has a value of at least 1 (preferably at least 4), p is a number that has a value of at least 1, there are not more than three hydrogen atoms represented by $R^0$ in the copolymer (preferably less than one or none), and at least 25 weight-percent of the groups represented by $(OC_mH_{2m})$ are oxyethylene groups.

U.S. Pat. No. 4,150,013 to J. O. Punderson describes melt-processible tetrafluoroethylene copolymers containing organopolysiloxanes which are useful as wire insulation coatings. The organopolysiloxane is present in an amount of between about 0.2 and 5 percent by weight, based on the weight of the resulting copolymer composition. Representative organopolysiloxanes include polyphenylmethylsiloxane, polydimethylsiloxane, polymethylsiloxane, a copolymer of phenylmethylsiloxane and dimethylsiloxane, and the like.

A high viscosity silicone blending process is disclosed in U.S. Pat. No. 4,446,090 to E. M. Lovgren et al. The blends produced by the process are stated to have engineering properties and flame retardance superior to known blends. The process involves (a) melting a solid thermoplastic composition comprising one or more thermoplastic polymers within an extruder, (b) injecting a high viscosity silicone fluid into the molten thermoplastic composition within the extruder, and (c) blending said molten thermoplastic composition with said high viscosity silicone fluid within the extruder. The thermoplastic compositions include polyethylene and polypropylene. The silicone fluid typically is a polydimethylsiloxane. The blend can contain such additives as reinforcing fillers, antioxidants, lubricants, flame retardants, and the like. The additives can be introduced by means of the thermoplastic polymers, the silicone fluid, or both. Typical flame retardants include magnesium stearate, calcium stearate, barium stearate, antimony oxide, and decabromodiphenyloxide.

Siloxane-containing polymers are described in U.S. Pat. Nos. 4,480,009 and 4,499,149 to A. Berger. The properties of polymeric compositions are stated to be improved by the presence of a polysiloxane unit having a defined formula. The listing of polymers, however, does not include polyolefins. The disclosed compositions apparently are useful as protective coatings and as molding, extruding, laminating, and calendaring compositions. Solutions of the compositions can be used to prepare films and fibers.

U.S. Pat. No. 4,500,659 to L. A. Kroupa and E. H. Relyea relates to extrudable, curable polyorganosiloxane compositions. The compositions are similar to those of U.S. Pat. No. 4,585,830, described below. In the present case, the compositions comprise (A) a liquid triorganosiloxy end-blocked polydimethylsiloxane wherein the triorganosiloxy units are dimethylvinylsiloxy or methylphenylvinylsiloxy; (B) a reinforcing silica filler which has been reacted with a liquid or solubilized treating agent, at least one component of which is a liquid hydroxy end-blocked polyorganosiloxane wherein at least 50 percent of the silicon atoms are bonded to a fluorine-substituted hydrocarbon radical; (C) a liquid methylhydrogensiloxane having an average of at least three silicon-bonded hydrogen atoms per molecule; and (D) a platinum-containing catalyst. The bonded treating agent for the silica filler would be incompatible, i.e., insoluble, with the polydimethylsiloxane component if it were not bonded to the silica.

Olefin polymer compositions containing silicone additives are described in U.S. Pat. No. 4,535,113 to G. N. Foster and R. B. Metzler. The compositions apparently can be extruded through relatively narrow die gaps at commercial extrusion rates to provide films having improved optical and mechanical properties. The silicone additives have the formula,

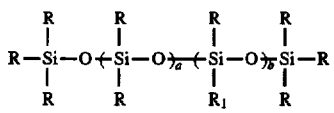

in which each R, which can be the same or different, is an alkyl radical preferably having from one to six carbon atoms, $R^1$ is a monovalent organic radical containing at least one ethyleneoxide group, vicinal epoxy group, or amino group, and a and b, which can be the same or different, each have a value of at least 1 and generally have a value of from about 4 to about 5,000. The silicone additives typically are present in the compositions in an amount of from about 0.01 to about 5 percent by weight.

U.S. Pat. No. 4,585,830 to R. P. Sweet describes polyorganosiloxane compositions useful for preparing unsupported extruded profiles. Such compositions are stated to include a triorganosiloxy end-blocked polydiorganosiloxane containing at least two vinyl radicals per molecule, in which at least 50 percent of the silicon-bonded organic radicals are methyl; and an organohydrogensiloxane containing at least two silicon-bonded hydrogen atoms per molecule, in which said hydrogen atoms are bonded to different silicon atoms. Examples of such two types of compounds are dimethylvinylsiloxy end-blocked polydimethylsiloxanes and trimethylsiloxy end-blocked dimethylsiloxane/methylhydrogensiloxane copolymers, respectively.

The teaching of U.S. Pat. No. 4,923,914 represents a significant improvement over prior methods of imparting water-wettability to shaped articles, e.g., nonwoven webs, made from inherently hydrophobic polymers. As noted, however, there is a need to improve upon such teaching in order to avoid the loss of wettability, or aging, of nonwoven webs over time. This need is especially apparent in products having such wettable nonwovens as components, such as disposable diapers, incontinent products, and feminine napkins.

SUMMARY OF THE INVENTION

It therefore is an object of the present invention to provide a surface-segregatable, melt-extrudable thermoplastic composition which, upon melt-processing to give a nonwoven web, produces fibers which are wettable by water and which remain wettable over time.

It is a further object of the present invention to provide a method for preparing a wettable nonwoven web which remains wettable over time.

Another object of the present invention is to provide a wettable nonwoven web which remains wettable over time.

These and other objects will be apparent to those having ordinary skill in the art from a consideration of the specification and claims which follow.

Accordingly, the present invention provides a surface-segregatable, melt-extrudable thermoplastic composition which comprises a thermoplastic polyolefin and an additive having the general formula,

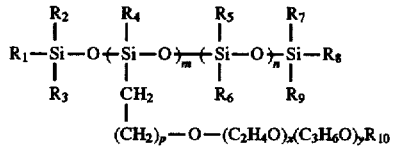

in which:

(A) $R_1$–$R_9$ are independently selected monovalent $C_1$–$C_3$ alkyl groups;

(B) $R_{10}$ is hydrogen or a monovalent $C_1$–$C_3$ alkyl group;

(C) m represents an integer of from 1 to about 4;

(D) n represents an integer of from 0 to about 3;

(E) the sum of m and n is in the range of from 1 to about 4;

(F) p represents an integer of from 0 to about 5;

(G) x represents an integer of from 1 to about 10;

(H) y represents an integer of from 0 to about 5;

(I) the ratio of x to y is equal to or greater than 2;

(J) said additive has a molecular weight of from about 350 to about 1,400; and (K) said additive is present in an amount of from about 0.5 to about 5 percent by weight, based on the amount of thermoplastic polyolefin.

The present invention also provides a method for preparing a wettable nonwoven web which remains wettable after its formation for at least two years at ambient temperature, which method comprises:

(A) melting a mixture which comprises a thermoplastic polyolefin and an additive;

(B) forming fibers by extruding the resulting melt through a die at a shear rate of from about 50 to about 30,000 sec$^{-1}$ and a throughput of no more than about 5.4 kg/cm/hour;

(C) drawing said fibers; and (D) collecting said fibers on a moving foraminous surface as a web of entangled fibers;

in which:

(1) said additive has the general formula,

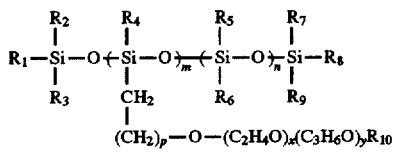

in which:

(a) $R_1$–$R_9$ are independently selected monovalent $C_1$–$C_3$ alkyl groups;

(b) $R_{10}$ is hydrogen or a monovalent $C_1$–$C_3$ alkyl group;

(c) m represents an integer of from 1 to about 4;

(d) n represents an integer of from 0 to about 3;

(e) the sum of m and n is in the range of from 1 to about 4;

(f) p represents an integer of from 0 to about 5;

(g) x represents an integer of from 1 to about 10;

(h) y represents an integer of from 0 to about 5;

(i) the ratio of x to y is equal to or greater than 2;

(j) said additive has a molecular weight of from about 350 to about 1,400; and (k) said additive is present in an amount of from about 0.5 to about 5 percent by weight, based on the amount of thermoplastic polyolefin.

The present invention further provides a method for preparing a wettable nonwoven web which remains wettable after its formation for at least two years at ambient temperature, which method comprises:

(A) melting a mixture which comprises a thermoplastic polyolefin and an additive;

(B) forming continuous fibers by extruding the resulting melt through a die at a shear rate of from about 50 to about 30.000 sec$^{-1}$ and a throughput of no more than about 5.4 kg/cm/hour;

(C) drawing said continuous fibers;

(D) collecting said continuous fibers into a tow;

(E) cutting said tow into staple fibers;

(F) laying said staple fibers onto a moving foraminous surface as a web of entangled fibers; and (G) bonding the resulting nonwoven web;

in which:

(1) said additive has the general formula,

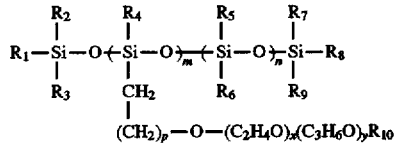

in which:

(a) $R_1$–$R_9$ are independently selected monovalent $C_1$–$C_3$ alkyl groups;

(b) $R_{10}$ is hydrogen or a monovalent $C_1$–$C_3$ alkyl group;

(c) m represents an integer of from 1 to about 4;

(d) n represents an integer of from 0 to about 3;

(e) the sum of m and n is in the range of from 1 to about 4;

(f) p represents an integer of from 0 to about 5;

(g) x represents an integer of from 1 to about 10;

(h) y represents an integer of from 0 to about 5;

(i) the ratio of x to y is equal to or greater than 2;

(j) said additive has a molecular weight of from about 350 to about 1,400; and (k) said additive is present in an amount of from about 0.5 to about 5 percent by weight, based on the amount of thermoplastic polyolefin.

The present invention still further provides a nonwoven web comprising fibers prepared from the above-described composition, which web remains wettable for at least two years at ambient temperature, as well as a disposable absorbent article containing such nonwoven web.

In preferred embodiments, n is 0, in which case the additive will have the general formula,

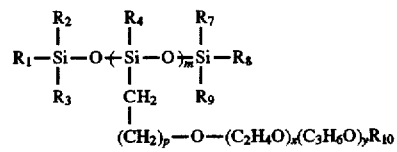

in which each of $R_1$–$R_4$, $R_7$–$R_{10}$, m, p, x, and y are as already defined.

DETAILED DESCRIPTION OF THE INVENTION

The use herein of the term "surface-segregatable" is consistence with its use in U.S. Pat. No. 4,923,914. Upon melt-extruding a composition of the present invention to form fibers, there is in such a fiber a differential, increasing concentration of the additive from the center to the surface thereof. The concentration of additive at or near the surface of the fiber is sufficient to render the normally hydrophobic polyolefin wettable by water, or hydrophilic. Unless stated otherwise, the term "hydrophilic" will be used herein to mean water-wettable. Thus, there is a controlled migration or segregation of additive toward the surface of the fiber which results in a controllable, differential concentration of additive in the fiber. Because the concentration of additive in the center portion of the fiber typically will vary nonlinearly from the concentration of the additive at or near the surface, this concentration difference is referred to herein as a differential concentration.

The term "melt-extrudable" is equivalent to "melt-processable" and is not intended to be limited in any way. That is, the term is intended to encompass the use of the composition in any melt-extrusion process which is or may be employed to prepare nonwoven webs, provided the process meets the limitations imposed by the claims. Thus, the term includes the use of the composition in meltblowing, spunbonding, coforming, and the like.

In general, the term "thermoplastic polyolefin" is used herein to mean any thermoplastic polyolefin which can be used for the preparation of nonwoven webs. Examples of thermoplastic polyolefins include polyethylene, polypropylene, poly(1-butene), poly(2-butene), poly(1-pentene), poly(2-pentene), poly(3-methyl-t-pentene), poly(4-methyl-1-pentene), 1,2-poly-1,3-butadiene, 1,4-poly-1,3-butadiene, polyisoprene, polychloroprene, polyacrylonitrile, poly(vinyl acetate), poly(vinylidene chloride), polystyrene, and the like.

The preferred polyolefins are those which contain only hydrogen and carbon atoms and which are prepared by the addition polymerization of one or more unsaturated monomers. Examples of such polyolefins include, among others, polyethylene, polypropylene, poly(1-butene), poly(2-butene), poly(1-pentene), poly(2-pentene), poly(3-methyl-1-pentene), poly(4-methyl-1-pentene), 1,2-poly-1,3-butadiene, 1,4-poly-1,3-butadiene, polyisoprene, polystyrene, and the like. In addition, such term is meant to include blends of two or more polyolefins and random and block copolymers prepared from two or more different unsaturated monomers. Because of their commercial importance, the most preferred polyolefins are polyethylene and polypropylene.

The composition of the present invention must contain at least one additive having the general formula,

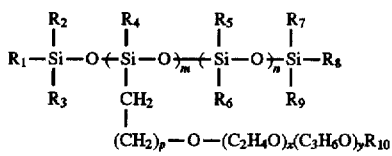

in which:

(a) $R_1$–$R_9$ are independently selected monovalent $C_1$–$C_3$ alkyl groups;

(b) $R_{10}$ is hydrogen or a monovalent $C_1$–$C_3$ alkyl group;

(c) m represents an integer of from 1 to about 4;

(d) n represents an integer of from 0 to about 3;

(e) the sum of m and n is in the range of from 1 to about 4;

(f) p represents an integer of from 0 to about 5;

(g) x represents an integer of from 1 to about 10;

(h) y represents an integer of from 0 to about 5;

(i) the ratio of x to y is equal to or greater than 2; and (j) said additive has a molecular weight of from about 350 to about 1,400.

In preferred embodiments, each of $R_1$–$R_{10}$ is a methyl group. In other preferred embodiments, $R_{10}$ is either hydrogen or a methyl group. In yet other preferred embodiments, m is either 1 or 2. In still other preferred embodiments, p is either 1 or 2, but most preferably is 2. In yet other preferred embodiments, y is 0 and x is 7 or 8.

Preferably, n will be 0, in which case the additive will have the general formula,

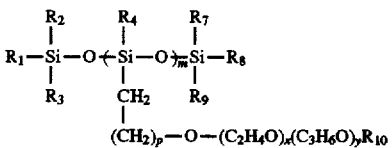

in which each of $R_1$–$R_{10}$, m, p, x, and y are as already defined.

While the additive molecular weight can vary from about 350 to about 1,400, it preferably will not exceed about 1,000. Most preferably, the molecular weight will be in the range of from about 350 to about 700.

While the additive can be either a liquid or a solid, a liquid is preferred. It also is preferred that a liquid additive have a surface tension which is less than that of virgin polymer; the lower surface tension assures that the additive will be more likely to completely "wet" or cover the surface of the fiber or film as the segregation process proceeds to completion, especially under conditions favoring a large concentration differential.

In general, the additive will be present in an amount of from about 0.5 to about 5 percent by weight, based on the amount of thermoplastic polyolefin. As a practical matter, additive levels of from about 1 to about 3 percent by weight are preferred.

The term "additive" is used broadly herein to encompass the use of more than one additive in a given composition, i.e., a mixture of two or more additives. Moreover, it should be appreciated by those having ordinary skill in the art that additives as defined herein typically are not available as pure compounds. Thus, the presence of impurities or related materials which may not come within the general formula given above for the additives does remove any given material from the spirit and scope of the present invention. For example, the preparation of additives useful in the present invention typically results in the presence of free polyether. The presence of such free polyether is not known to have deleterious effects, although, in order to achieve a desired delay time with a given additive, it may be necessary to increase the amount of additive to compensate for the presence of free polyether. As a practical matter, it is preferred that the amount of free polyether present in any additive be no more than about 30 percent by weight. More preferably, the amount of free polyether present in an additive will be no more than about 20 percent by weight.

Turning now to the method of the present invention, a wettable nonwoven web which remains wettable for at least two years at ambient temperature is prepared by the method which comprises:

(A) melting a mixture which comprises a thermoplastic polyolefin and an additive;

(B) forming fibers by extruding the resulting melt through a die at a shear rate of from about 50 to about 30,000 sec$^{-1}$ and a throughput of no more than about 5.4 kg/cm/hour;

(C) drawing said fibers; and (D) collecting said fibers on a moving foraminous surface as a web of entangled fibers;

in which:

(1) said additive has the general formula,

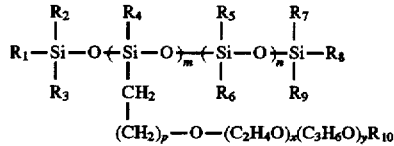

in which:

(a) $R_1$–$R_9$ are independently selected monovalent $C_1$–$C_3$ alkyl groups;

(b) $R_{10}$ is hydrogen or a monovalent $C_1$–$C_3$ alkyl group;

(c) m represents an integer of from 1 to about 4;

(d) n represents an integer of from 0 to about 3;

(e) the sum of m and n is in the range of from 1 to about 4;

(f) p represents an integer of from 0 to about 5;

(g) x represents an integer of from 1 to about 10;

(h) y represents an integer of from 0 to about 5;

(i) the ratio of x to y is equal to or greater than 2;

(j) said additive has a molecular weight of from about 350 to about 1,400; and (k) said additive is present in an amount of from about 0.5 to about 5 percent by weight, based on the amount of thermoplastic polyolefin.

In the first step of the method of the present invention, a mixture which comprises a thermoplastic polyolefin and an additive is melted. This typically is done in an extruder which is an integral part of the apparatus used to form fibers.

Fibers then are formed by extruding the molten mixture through a die. Although the nature of the die is not known to be critical, it most often will have a plurality of orifices arranged in one or more rows extending the full machine width. Such orifices may be circular or noncircular in cross-section. The fibers extruded may be either continuous or discontinuous.

In general, the shear rate will be in the range of from about 50 to about 30,000 sec$^{-1}$. Preferably, the shear rate will be in the range of from about 150 to about 5,000 sec$^{-1}$, and most preferably from about 300 to about 2,000 sec$^{-1}$.

Throughput is of importance because it affects the time the newly formed fiber or film is in a sufficiently molten or fluid state to allow migration or segregation of the additive toward the newly formed surfaces, even though throughput also affects the shear rate.

Throughput typically will be in the range of from about 0.01 to about 5.4 kg/cm/hour. Preferably, throughput will be in the range from about 0.1 to about 4.0 kg/cm.hour. The throughput most preferably will be in the range of from about 0.5 to about 2.5 kg/cm/hour.

As used herein; the phrase "molten state" does not necessarily mean "flowable". Rather, the term is used to denote a condition of the thermoplastic composition in which the additive molecules still are capable of migrating or segregating to the surface of the newly formed fiber or film. Thus, the term is somewhat imprecise and not readily subject to accurate measurement. Consequently, this composition fluidity factor preferentially is described or accounted for by the term "throughput".

The fibers then are drawn, typically by entraining them in a fluid stream having a sufficiently high velocity. When continuous fibers are produced, the fibers first are cooled in a quenching fluid which usually is low pressure air. The fluid stream which draws the fibers, usually air, can be a stream of high velocity air separate from the quenching fluid, or it can be a portion of the quenching fluid which is accelerated by passage into a narrow nozzle. In the production of discontinuous fibers, on the other hand, the fluid stream usually is a heated, high velocity stream of air which draws the fibers while they are in an at least partially molten or softened state.

The drawn fibers then are collected on a moving foraminous surface as a web of entangled fibers. The foraminous surface can be, by way of example only, a revolving drum or a continuous belt or wire screen; the latter is most commonly used on commercial-scale equipment.

In general, the steps of melting, forming, drawing, and collecting are carried out as described in such processes as meltblowing, coforming, spunbonding, and the like. By way of illustration only, such processes are exemplified by the following references which are incorporated herein by reference:

(a) meltblowing references include, by way of example, U.S. Pat. Nos. 3,016,599 to R. W. Perry, Jr., 3,704,198 to J. S. Prentice, 3,755,527 to J. P. Keller et al., 3,849,241 to R. R. Butin et al., 3,978,185 to R. R. Butin et al., and 4,663,220 to T. J. Wisneski et al. See, also, V. A. Wente, "Superfine Thermoplastic Fibers", *Industrial and Engineering Chemistry*, Vol. 48, No. 8, pp. 1342–1346 (1956); V. A. Wente et al., "Manufacture of Superfine Organic Fibers", Navy Research Laboratory, Washington, D.C., NRL Report 4364 (111437), dated May 25, 1954, United States Department of Commerce, Office of Technical Services; and Robert R. Butin and Dwight T. Lohkamp, "Melt Blowing—A One-Step Web Process for New Nonwoven Products", *Journal of the Technical Association of the Pulp and Paper Industry*, Vol. 56, No.4, pp. 74–77 (1973);

(b) coforming references (i.e., references disclosing a meltblowing process in which fibers or particles are comingled with the meltblown fibers as they are formed) include U.S. Pat. Nos. 4,100,324 to R. A. Anderson et al. and 4,118,531 to E. R. Hauser; and (c) spunbonding references include, among others, U.S. Pat. Nos. 3,341,394 to Kinney, 3,655,862 to Dorschner et al., 3,692,618 to Dorschner et al., 3,705,068 to Dobo et al., 3,802,817 to Matsuki et al., 3,853,651 to Porte, 4,064,605 to Akiyama et al., 4,091,140 to Harmon, 4,100,319 to Schwartz, 4,340,563 to Appel and Morman, 4,405,297 to Appel and Morman, 4,434,204 to Hartman et al., 4,627,811 to Greiser and Wagner, and 4,644,045 to Fowells.

It may be noted at this point that if continuous fibers are formed, such as by a spunbonding process, the resulting web usually must be bonded by any known means in order to give the web sufficient integrity to permit its removal from the foraminous support. In general, such bonding can be by any known means. As a practical matter, however, the web will be pattern bonded by the application of heat and pressure. Preferably, such application of heat and pressure will be in the ranges of from about 80° C. to about 180° C. and from about 150 to about 1,000 pounds per linear inch (59–178 kg/cm), respectively. More preferably, a pattern having from about 10 to about 250 bonds/inch$^2$ (1–40 bonds/cm$^2$) covering from about 5 to about 30 percent of the wipe surface area will be employed.

Such pattern bonding is accomplished in accordance with known procedures. See, for example, U.S. Design Pat. No. 239,566 to Vogt, U.S. Design Pat. No. 264,512 to Rogers, U.S. Pat. No. 3,855,046 to Hansen et al., and U.S. Pat. No. 4,493,868, supra, for illustrations of bonding patterns and a discussion of bonding procedures.

A wettable nonwoven web which remains wettable for at least two years at ambient temperature also can be prepared from staple fibers by known methods. In this case, such a web is prepared by the method which comprises:

(A) melting a mixture which comprises a thermoplastic polyolefin and an additive;

(B) forming continuous fibers by extruding the resulting melt through a die at a shear rate of from about 50 to about 30,000 sec$^{-1}$ and a throughput of no more than about 5.4 kg/cm/hour;

(C) drawing said continuous fibers;

(D) collecting said continuous fibers into a tow;

(E) cutting said tow into staple fibers;

(F) laying said staple fibers onto a moving foraminous surface as a web of entangled fibers; and (G) bonding the resulting nonwoven web;

in which:

(1) said additive has the general formula,

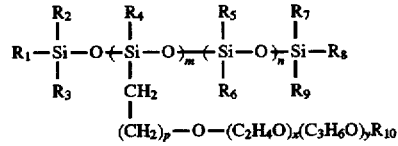

in which:

(a) $R_1$–$R_9$ are independently selected monovalent $C_1$–$C_3$ alkyl groups;

(b) $R_{10}$ is hydrogen or a monovalent $C_1$–$C_3$ alkyl group;

(c) m represents an integer of from 1 to about 4;

(d) n represents an integer of from 0 to about 3;

(e) the sum of m and n is in the range of from 1 to about 4;

(f) p represents an integer of from 0 to about 5;

(g) x represents an integer of from 1 to about 10;

(h) y represents an integer of from 0 to about 5;

(i) the ratio of x to y is equal to or greater than 2;

(j) said additive has a molecular weight of from about 350 to about 1,400; and (k) said additive is present in an amount of from about 0.5 to about 5 percent by weight, based on the amount of thermoplastic polyolefin.

Each of the foregoing steps also is carried out by any of several means which are well known to those having ordinary skill in the art. If desired, individual continuous fibers can be false twisted before collecting them as a tow. Moreover, the tow can be crimped before cutting into staple-length fibers. Although the staple fibers can be laid onto the moving foraminous support by any known means, the fibers preferably will be either air-laid or wet-laid.

Finally, the bonding of the resulting nonwoven web can be by any known means, as described hereinabove. Again, however, the web preferably will be pattern bonded by the application of heat and pressure, also as already described.

The present invention is further described by the examples which follow. Such examples, however, are not to be construed as limiting in any way either the spirit or scope of the present invention. In the examples, all temperatures are in degrees Celsius and all parts are by weight unless stated otherwise.

EXAMPLE 1

For the small-scale meltblowing trials described in this example, the thermoplastic polyolefin employed was Escorene 3445 polypropylene (Exxon Chemical Americas, Houston, Tex. 77079). According to the manufacturer, the polymer has a density of 0.900 g/cc and a melt flow rate of 35g/10 minutes. The polymer did not contain titanium dioxide.

Seven different additives were employed, four which come within the scope of the claims of the present invention (Additives A, B, C, and D) and three which do not (Additives E, F, and G). The additives are described briefly below.

Additive A

Additive A is a trisiloxane polyether, PS-071, supplied by Petrarch Systems, Bristol, Pa. The material has the formula,

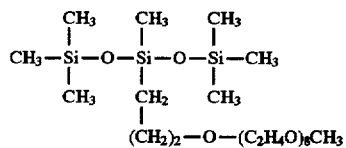

The material has a theoretical molecular weight of 646. Based on gel permeation chromatography studies (American Polymer Standards Corporation, Mentor, Ohio) relative to PDMS standards, the following average molecular weights were calculated:

Weight-average molecular weight: 581
Number-average molecular weight: 544
Z-average molecular weight: 610
Polydispersity: 1.07

The material contained an estimated 3.6 percent low molecular weight material, based on total peak area and main peak area comparisons, and an estimated 10–16 percent free polyether.

Additive B

This additive also is a trisiloxane polyether, L-77, supplied by Union Carbide Corporation, Danbury, Conn., which differs from Additive A primarily in having one less oxyethylene group (i.e., n is 7, rather than 8).

The material has a theoretical molecular weight of 602. Based on gel permeation chromatography studies (American Polymer Standards Corporation, Mentor, Ohio) relative to PDMS standards, the following average molecular weights were calculated:

Weight-average molecular weight: 557
Number-average molecular weight: 480
Z-average molecular weight: 614
Polydispersity: 1.16

The material contained an estimated 7.8 percent low molecular weight material, based on total peak area and main peak area comparisons, and an estimated 20–25 percent free polyether.

Additive C

Additive C is a polysiloxane polyether, T-5878, supplied by Th. Goldschmidt AG, Essen, Federal Republic of Germany. The material is essentially the same as Additive A.

Based on gel permeation chromatography studies (American Polymer Standards Corporation, Mentor, Ohio) relative to PDMS standards, the following average molecular weights were calculated:

Weight-average molecular weight: 602
Number-average molecular weight: 527
Z-average molecular weight: 672
Polydispersity: 1.14

The material contained an estimated 9.8 percent low molecular weight material, based on total peak area and main peak area comparisons, and an estimated 20–25 percent free polyether.

Additive D

This additive is another trisiloxane polyether, T-5847, which differs from Additive A primarily in having two additional oxyethylene groups (i.e., n is 10, rather than 8), and two oxypropylene groups (not shown in the formula for Additive A). In addition, the terminal group of the poly (oxyalkylene) moiety is hydrogen rather than a methyl group.

The material has a theoretical molecular weight of 790, a weight-average molecular weight of 836, and a polydispersity of 1.20.

Additive E

This additive is a polysiloxane polyether, D-985, also supplied by Th. Goldschmidt AG. The material has the formula,

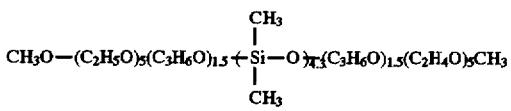

The material is reported to have a molecular weight of 1023.

Additive F

Additive F is a polysiloxane polyether, V-284, supplied by Th. Goldschmidt AG and closely related to Additive D. The additive reportedly has six repeating dimethylsiloxy groups. The polyether moieties are methyl-capped, but nothing else is known about the material's structure Additive G This additive is a polysiloxane polyether, V-290, supplied by Th. Goldschmidt AG and closely related to Additive E.

The additive reportedly has six repeating dimethylsiloxy groups, but nothing else is known about the material's structure Polymer and additive were mixed by placing a weighed amount of polymer pellets in a beaker and pouring two percent by weight of additive, based on the weight of polymer, over the pellets. The mixture was stirred until the additive was adsorbed by the polymer.

Meltblown webs were formed by means of a bench-scale apparatus having a single orifice in the die tip. The apparatus consisted of a cylindrical steel reservoir having a capacity of about 15 g. The reservoir was enclosed by an electrically heated steel jacket. The temperature of the reservoir was thermostatically controlled by means of a feedback thermocouple mounted in the body of the reservoir. The extrusion orifice had a diameter of 0.016 inch (0.41 mm) and a length of 0.060 inch (1.5 mm). A second thermocouple was mounted near the die tip. The exterior surface of the die tip was flush with the reservoir body. Extrusion of polymer-additive mixture was accomplished by means of a compressed air piston in the reservoir. The extruded filament was surrounded and attenuated by a cylindrical air stream exiting a circular 0.075-inch (1.9-mm) gap. Attenuating air pressures typically were of the order of 5–90 psig. The forming distance was approximately 10 inches (25 cm). The attenuated extruded filament was collected on the clear plastic film of an 8.5×11 inch (21.6×27.9 cm) loose leaf protector having a black paper insert. The resulting webs were stored within the plastic protectors for about two years.

The wettability of each web was estimated by placing a drop of water on the web and measuring the time required for complete penetration of the water drop into the web (referred to hereinafter as wetting time). Each web was tested with a minimum of five drops of water placed in five different locations. Each web was tested immediately after its formation and at intervals thereafter. The results are summarized in Table 1.

TABLE 1

Summary of Meltblowing Trials on Bench-Scale Apparatus with 2 Percent by Weight Additive

| Additive | Wettability | | |
|---|---|---|---|
| | Immed. | 10–12 Weeks | About Two Years |
| A | Yes | Yes | Yes |
| B | Yes | Yes | Yes |
| C | Yes | Yes | Yes |
| D | Yes | Yes | Yes |
| E | Yes | No | No |
| F | Yes | No | No |
| G | Yes | No | No |

It is clear from Table 1 that all of the webs were wettable immediately after their formation, but that only additives coming within the scope of the claims of the present invention remained wettable for about two years when stored at ambient temperature. Indeed, webs made with additives not coming within the scope of the claims of the present invention lost their wettability after only 10–12 weeks.

EXAMPLE 2

Spunbonded nonwoven webs were prepared on a pilot-scale apparatus essentially as described in U.S. Pat. No. 4,360,563, which is incorporated herein by reference.

The thermoplastic polyolefin was that employed in Example 1. Two additives were employed. The first was Additive A of Example 1. The second additive was a polysiloxane Polyether, T-3004, supplied by Th. Goldschmidt AG, Essen, Federal Republic of Germany. The material has the formula,

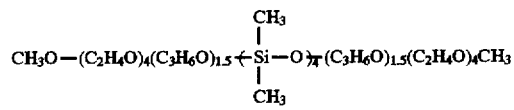

The calculated molecular weight of the additive is 852. Based on gel permeation chromatography studies (American Polymer Standards Corporation, Mentor, Ohio) relative to PDMS standards, the following average molecular weights were calculated:

Weight-average molecular weight: 750

Number-average molecular weight: 625

Z-average molecular weight: 820

Polydispersity: 1.20

The material contained an estimated 11.5 percent low molecular weight material, based on total peak area and main peak area comparisons, and an estimated 10–16 percent free polyether.

Additive was incorporated into the Polypropylene at a level of 1.0 percent by weight. The polymer and additive were simply mixed mechanically before introducing the mixture to the feed hopper of the extruder. Typically, a standard portable cement mixer was charged with 50 pounds of the polymer in pellet form. The mixer then was started and charged with the desired amount of additive. Mixing was allowed to continue for 20 minutes, after which time the mixture was removed from the mixer and stored in plastic-lined boxes. Polymer-additive mixtures were prepared which contained no titanium dioxide and titanium dioxide at levels of 2, 4, and 8 percent by weight, respectively.

The more significant process variables generally were as follows:

extruder temperature, 200°–233°;

melt inlet temperature, 233°–236°;

throughput, 39 kg per hour;

spin head temperature, 228°–233°;

pump block temperature, 231°–236°;

pack temperature, 237°–243°;

pack pressure, 200 psig;

melt temperature, 223°–224°;

In each case, webs were obtained which had a basis weight of about 60 g/m². In order to accelerate aging, samples of each web were maintained at 2° and 38°, respectively, for 12 weeks.

The wettability of each web was estimated as described in Example 1. Each web was tested immediately after its formation and daily thereafter during the 12-week aging test.

All of the webs made with the first additive, i.e., an additive coming within the scope of the claims, were wettable immediately after their formation. The webs made with the second additive were not wettable immediately after their formation, but became so upon heating them in a convection oven for 60 seconds at 100°. Within five days, the webs made with the second additive and which contained titanium dioxide at any level no longer were wettable. All of the webs made with the first additive remained wettable during the entire aging trial period.

Having thus described the invention, numerous changes and modifications thereof will be readily apparent to those having ordinary skill in the art without departing from the spirit or scope of the invention. For example, the compositions of the present invention also can contain fillers, delustrants, colorizers, stabilizers, and the like.

What is claimed is:

1. A wettable nonwoven web which remains wettable for at least two years at ambient temperature, which web comprises fibers formed from a surface-segregatable, melt-extrudable thermoplastic composition which comprises at least one thermoplastic polyolefin and at least one additive having the general formula,

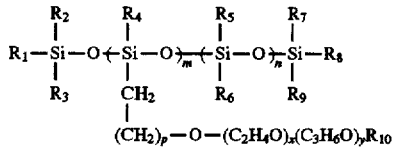

in which:

$R_1$–$R_9$ are independently selected monovalent $C_1$–$C_3$ alkyl groups;

$R_{10}$ is hydrogen or a monovalent $C_1$–$C_3$ alkyl group;

m represents an integer of from 1 to about 4;

n represents an integer of from 0 to about 3;

the sum of m and n is in the range of from 1 to about 4;

p represents an integer of from 0 to about 5;

x represents an integer of from 1 to about 10;

y represents an integer of from 0 to about 5;

the ratio of x to y is equal to or greater than 2;

said additive has a molecular weight of from about 350 to about 1,400; and said additive is present in an amount of from about 0.5 to about 5 percent by weight, based on the amount of thermoplastic polyolefin.

2. A disposable absorbent article, at least one component of which is the wettable nonwoven web of claim 1.

3. A disposable absorbent article, at least one component of which is the wettable nonwoven web of claim 1.

4. The wettable nonwoven web of claim 1, in which the thermoplastic polyolefin is polypropylene.

5. The wettable nonwoven web of claim 1, in which each of $R_1$–$R_9$ is a methyl group and $R_{10}$ is either hydrogen or a methyl group.

6. The wettable nonwoven web of claim 1, in which m is either 1 or 2.

7. The wettable nonwoven web of claim 1, in which p is either 1 or 2.

8. The wettable nonwoven web of claim 2, in which p is 2.

9. The wettable nonwoven web of claim 1, in which y is 0 and x is either 7 or 8.

10. The wettable nonwoven web of claim 1, in which said additive has a molecular weight of from about 350 to about 700.

11. The wettable nonwoven web of claim 10, in which said additive-is present in an amount of from about 1.0 to about 3.0 percent by Weight, based on the amount of thermoplastic polymer.

12. A disposable absorbent article at least one component of which is the wettable nonwoven web of claim 5.

13. A disposable absorbent article at least one component of which is the wettable nonwoven web of claim 6.

14. A disposable absorbent article at least one component of which is the wettable nonwoven web of claim 7.

15. A disposable absorbent article at least one component of which is the wettable nonwoven web of claim 8.

16. A disposable absorbent article at least one component of which is the wettable nonwoven web of claim 9.

17. A disposable absorbent article at least one component of which is the wettable nonwoven web of claim 10.

18. A disposable absorbent article at least one component of which is the wettable nonwoven web of claim 11.

* * * * *